US009569948B1

(12) United States Patent
Platt

(10) Patent No.: US 9,569,948 B1
(45) Date of Patent: Feb. 14, 2017

(54) CHILD DETECTION AND ALERT SYSTEM FOR A VEHICLE

(71) Applicant: Keith Platt, Dayton, TX (US)

(72) Inventor: Keith Platt, Dayton, TX (US)

( * ) Notice: Subject to any disclaimer, the term of this patent is extended or adjusted under 35 U.S.C. 154(b) by 0 days.

(21) Appl. No.: 14/710,382

(22) Filed: May 12, 2015

Related U.S. Application Data

(60) Provisional application No. 61/992,480, filed on May 13, 2014.

(51) Int. Cl.
*B60Q 1/00* (2006.01)
*G08B 21/02* (2006.01)
*G08B 21/24* (2006.01)

(52) U.S. Cl.
CPC ........... *G08B 21/0277* (2013.01); *G08B 21/24* (2013.01)

(58) Field of Classification Search
CPC ..... B60N 2/002; B60N 2/26; B60R 21/01556; G08B 21/22
See application file for complete search history.

(56) References Cited

U.S. PATENT DOCUMENTS

| | | | | |
|---|---|---|---|---|
| 6,922,147 B1 | | 7/2005 | Arora | |
| 7,009,522 B2 | | 3/2006 | Flanagan | |
| 7,466,221 B1 | * | 12/2008 | Lehr | B60N 2/2812 340/457.1 |
| 7,701,358 B1 | * | 4/2010 | White | B60R 16/0232 340/425.5 |
| 2007/0075574 A1 | | 4/2007 | James | |
| 2011/0109450 A1 | * | 5/2011 | Hirschfeld | B60N 2/002 340/457 |
| 2012/0232749 A1 | * | 9/2012 | Schoenberg | B60N 2/002 701/36 |

* cited by examiner

*Primary Examiner* — Omeed Alizada

(57) ABSTRACT

A child detection and alert system for a vehicle is an easily installed alert system for the driver of a motor vehicle that uses the vehicle's anti-theft system to notify the driver, after leaving the vehicle that a child has been left behind in a child car seat. The system has a sensor mat having two different types of sensors that is placed in the child car seat before the child is seated. The sensor mat has a battery, a transmitter for wirelessly transmitting a signal from the processor in the housing with the transmitter, and a charge cord. A second part of the system has a wireless receiver that plugs into the vehicle's computer and accesses the on-board vehicle anti-theft system to utilize the alarm functions that honk the horn and flash the lights if alarm conditions are met.

2 Claims, 5 Drawing Sheets

CHILD DETECTION AND ALERT SYSTEM FOR A VEHICLE

CROSS-REFERENCE TO RELATED APPLICATION

The present application is related to and claims priority from prior provisional application Ser. No. 61/992,480, filed May 13, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of systems for alerting vehicle drivers of unattended children left in vehicles, and more specifically relates to a child detection and alert system for a vehicle.

2. Description of the Related Art

On hectic and busy days, it can be very easy for adults to experience momentary confusion and lapses in judgment. Juggling the demands of career and family, parents can become particularly susceptible to this, despite their best intentions and diligence. Rushing from work to collect children from school or day care, a parent may have to complete many other errands before finally reaching home, such as making a bank deposit or picking up a few items from the market for dinner. The pressures of balancing a career with family responsibilities can often leave a parent or babysitter absent minded. Sometimes, in a family having older children as well as having an infant, the responsibility for caring for the infant can be shared. When the parent becomes too preoccupied, however, delegating the responsibility of exactly who is tasked with caring for the infant can be overlooked. There are increasing reports of children being accidently left behind in their car seats, with the windows rolled up on a hot day. Unfortunately, leaving a child alone in a car, even for a short period of time, can lead to tragic circumstances, especially on hot days. The statistics of child deaths relating to heat exposure from being left behind in cars is both alarming and sad.

As disturbing as the thought may be, the facts are indisputable. All it takes is a few minutes for the temperature inside a car, even with the windows cracked, to rise to dangerous levels. According to experts, even on a mild day at 73 degrees outside, an SUV can heat up to 100 degrees in 10 minutes, and to 120 in just 30 minutes. As the outdoor temperature rises, so does the heat buildup in a vehicle. At 90 degrees outside, the interior of a vehicle can heat up to 160 degrees within several minutes. Children's developing respiratory system makes them particularly vulnerable to heat exhaustion. As the heat rises, their body temperatures rise. An infant in a broken down car in 110-degree heat can get in trouble very quickly. Infants tend to heat up very quickly, rapidly approaching the temperature of their environment. Sadly, dozens of children die each year as a result of having been left alone in motor vehicles. A solution is needed to eliminate these types of tragic child deaths.

Various attempts have been made to solve the above-mentioned problems such as those found in U.S. Pat. No. 6,922,147 to Suneel Arora; U.S. Pat. No. 7,009,522 to Stephen R. Flanagan; and U.S. Publication No. 2007/0075574 to Reginald James. This art is representative of systems for alerting vehicle drivers of unattended children left in vehicles. None of the above inventions and patents, taken either singly or in combination, is seen to describe the invention as claimed.

Ideally, a systems for alerting vehicle drivers of unattended children left in vehicles should provide safety, convenience and effectiveness, and yet, would operate reliably and be manufactured at a modest expense. Thus, a need exists for a reliable child detection and alert system for a vehicle to avoid the above-mentioned problems.

BRIEF SUMMARY OF THE INVENTION

In view of the foregoing disadvantages inherent in the known systems for alerting vehicle drivers of unattended children left in vehicles art, the present invention provides a novel child detection and alert system for a vehicle. The general purpose of the present invention, which will be described subsequently in greater detail, is to provide a convenient and effective alarm system for detecting the presence of a child left behind in a child car seat.

The child detection and alert assembly is useful for detecting the presence of a child in a child car seat and alerting a driver-user that has just left the vehicle via an audible and a visual alarm through the anti-theft system of the vehicle that a child has been left behind in the vehicle. The child detection and alert system for a vehicle may comprise a child detection and alert assembly having a sensor mat with a transmitter, a battery, a battery charger having a charge cord, at least one thermal sensor and at least one weight sensor, and a receiver having a vehicle computer jack.

The child detection and alert assembly is structured and arranged to utilize an existing anti-theft system of a vehicle to activate a visual and an audible alarm in the event that an alarm condition is met. The system is activated to a ready position when the ignition switch of the vehicle is turned to the on position. The anti-theft system of the vehicle is activated to an alarm stage about 45 seconds after a thermal sensor and at least one weight sensor is activated after the ignition switch is turned off and the pre-set time delay period has expired. The assembly may also be activated about 5 minutes after a pre-determined high temperature is reached within the vehicle interior and the child detection and alert assembly detects the presence of a child in the child car seat. The child detection and alert assembly is then de-activated after a predetermined time delay period when the ignition switch of the vehicle is turned to an off position and no alarm condition is present.

The child detection and alert assembly preferably comprises a sensor mat, a transmitter, a battery, a charger, a charge cord, at least one thermal sensor, at least one weight sensor, and a receiver with a vehicle computer jack that are all operatively functional together to alert the occupant leaving the vehicle of the presence of a child left in the child car seat. The sensor mat is structured and arranged to be placed on the seat surface of a child car seat to detect body weight and body heat of a child sitting in the child car seat. The sensor mat is in operative communication with the battery and the transmitter which is both coupled to the sensor mat. The battery, the transmitter, and the electronic processor are each located within a single housing that is coupled to the sensor mat. The sensor mat may comprise an adhesive bottom side that is able to be placed on the seat surface of the child car seat to prevent movement of the sensor mat relative to the child car seat.

The transmitter is in wireless communication with the receiver and the receiver is in communication with the anti-theft system of the vehicle. The charger is in operative communication with the battery and the transmitter such that a vehicle electrical system is able to charge the battery of the sensor mat via the charger coupled to a lighter port of the vehicle. The battery is able to power the sensor mat without being coupled to a power source for a period of time.

The thermal sensors and the weight sensors are located between the top surface and the bottom surface of the sensor mat and are in communication with the transmitter. The transmitter of the sensor mat comprises an electronic processor that is structured and arranged to interpret a signal from the thermal and weight sensors to determine whether there is a child sitting in the child car seat or not. There is a reset button located on the electronic processor designed to disarm and to simultaneously reset an activated alarm.

The child detection and alert assembly further may comprise a key ring fob that is able to receive a wireless signal indicating an alarm condition occurring at the vehicle and to emit an audible alarm via the internally located micro-buzzer. The key ring fob is in wireless communication with the transmitter and may be able to pick up the wireless signal from at least 50 feet away, and at much greater distances in favorable conditions. The key ring fob preferably is able to audibly produce at least a 90 db signal notifying the user of the alarm condition.

The child detection and alert assembly is designed so that more than one sensor mat is able to be used simultaneously with one receiver for families having more than one child. The second sensor mat may be paired to operate in tandem with the first sensor mat and the receiver is able to receive a wireless signal from either sensor mat to activate the vehicle's anti-theft system. A wireless proximity sensor deactivates the sensor mat anytime the sensor mat is moved 10 feet or more away from the receiver. This allows the driver-user to uncouple the child car seat and remove it from the vehicle without having to adjust or disable the system in any way, which prevents the driver-user from forgetting to re-activate the system.

The child detection and alert assembly may be manufactured as a retro-fit that can easily be installed by the user. The sensor mat is adhesively attached to the seat of the child car seat and the receiver is coupled to the vehicle's computer via the computer access plug underneath the dash to complete the installation. The child detection and alert assembly may also be manufactured as original manufacturer equipment for new vehicles. Weight and heat sensors may also be included in all the seats in some embodiments on new vehicles.

The child detection and alert system for a vehicle may comprise a kit that includes at least one child detection and alert assembly having at least one sensor mat having a transmitter, a battery, a battery charger with a charge cord, at least one thermal sensor, at least one weight sensor, at least one receiver having a vehicle computer jack, and a set of user instructions.

A method of using the child detection and alert system for a vehicle may comprise the steps of: placing a child in a child car seat having an installed sensor mat, coupling the battery charger of the sensor mat to the cigarette lighter socket of the vehicle, coupling the receiver to the anti-theft system module of the vehicle via the vehicle computer jack of the receiver, driving the vehicle, parking the vehicle and unplugging the battery charger, and removing the child from the child car seat.

The present invention holds significant improvements and serves as a child detection and alert system for a vehicle. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, child detection and alert system for a vehicle, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a system for alerting vehicle drivers of unattended children and more particularly to a child detection and alert system for a vehicle as used to improve the convenience and effectiveness of a notification system to vehicle drivers of children left behind in the vehicle.

Generally speaking, the child detection and alert system for a vehicle is an easily installed alert system for the driver of a motor vehicle that uses the vehicle's anti-theft system to notify the driver, after leaving the vehicle, that a child has been left behind in a child car seat. The system has a sensor mat having two different types of sensors that is placed in the child car seat before the child is seated. The sensor mat has a battery, a transmitter for wirelessly transmitting a signal from the processor in the housing with the transmitter, and a charge cord. A second part of the system has a wireless receiver that plugs into the vehicle's computer and accesses the on-board vehicle anti-theft system to utilize the alarm functions that honk the horn and flash the lights if alarm conditions are met. A secondary safety of the system rolls down the windows half way if an alarm condition exists and the vehicle interior reaches a pre-determined high temperature to cool the car interior down.

Figure 1:
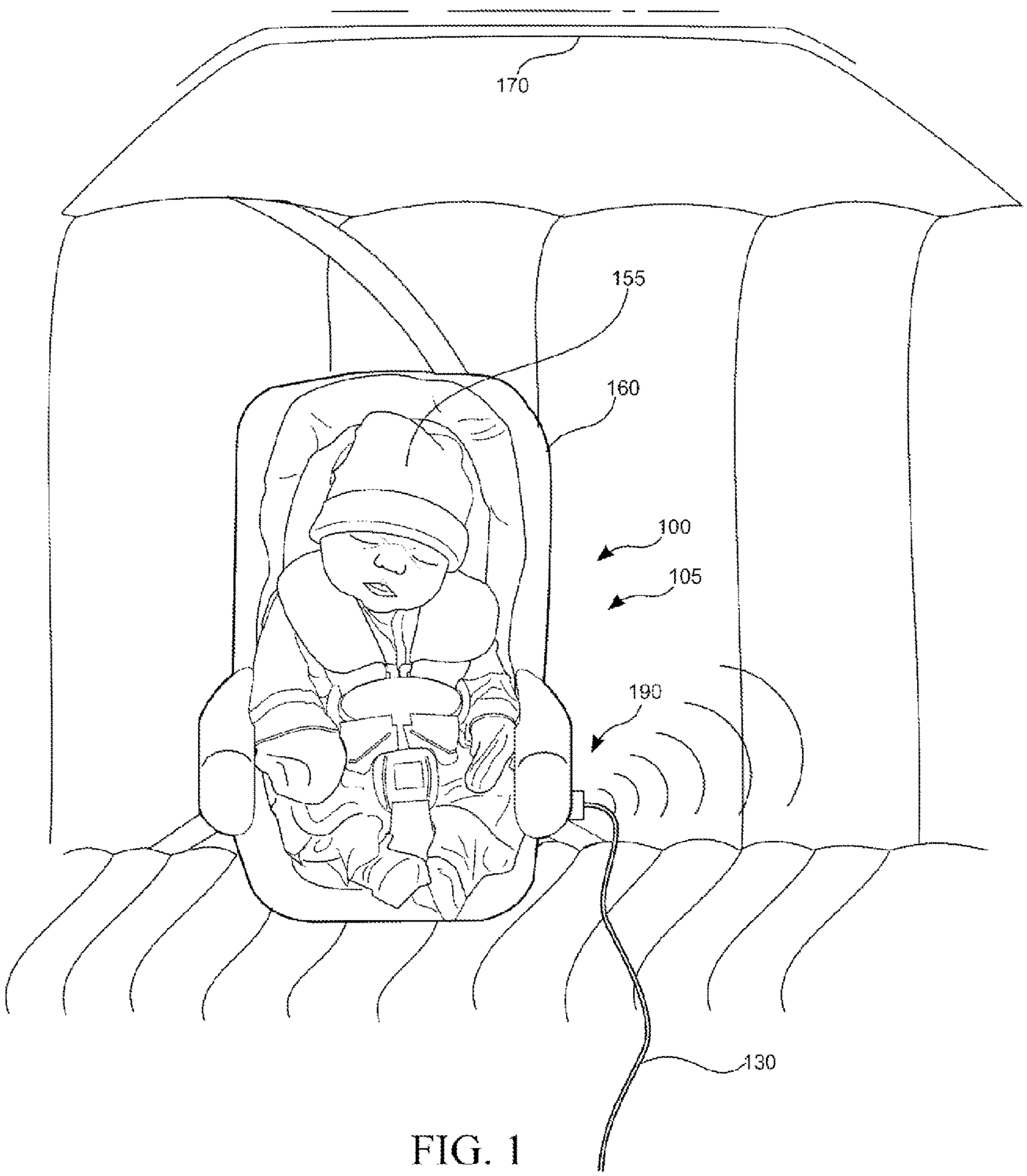
FIG. 1 shows a perspective view illustrating an in-use condition of a child detection and alert system for a vehicle according to an embodiment of the present invention.

Referring to the drawings by numerals of reference there is shown in FIG. 1, a perspective view illustrating an in-use condition of child detection and alert system for a vehicle 100 according to an embodiment of the present invention.

Child detection and alert assembly 105 is useful for detecting the presence of child 155 in child car seat 160 and alerting driver-user that has just left vehicle 170 via an audible and a visual alarm through the anti-theft system of vehicle 170 that child 155 has been left behind in vehicle 170. Child detection and alert assembly 105 is structured and arranged to utilize the existing anti-theft system of vehicle 170 to activate a visual and an audible alarm in the event that an alarm condition is met. The system is designed so that driver-user is not able to get very far from vehicle 170 equipped with child detection and alert assembly 105 before alerting driver-user of the presence of child 155 left in vehicle 170. System 100 is also designed to attract attention from passersby in case driver-user has moved too far from vehicle 170 to realize that his vehicle's 170 alarm system is in an alarm state. As a secondary safety feature, after 5 minutes without the alarm being reset, the system will automatically roll the windows down in vehicles 170 equipped with electric windows. The system has key ring fob 175 having micro-buzzer 180 to alert driver-user of an alarm condition.

Figure 2:
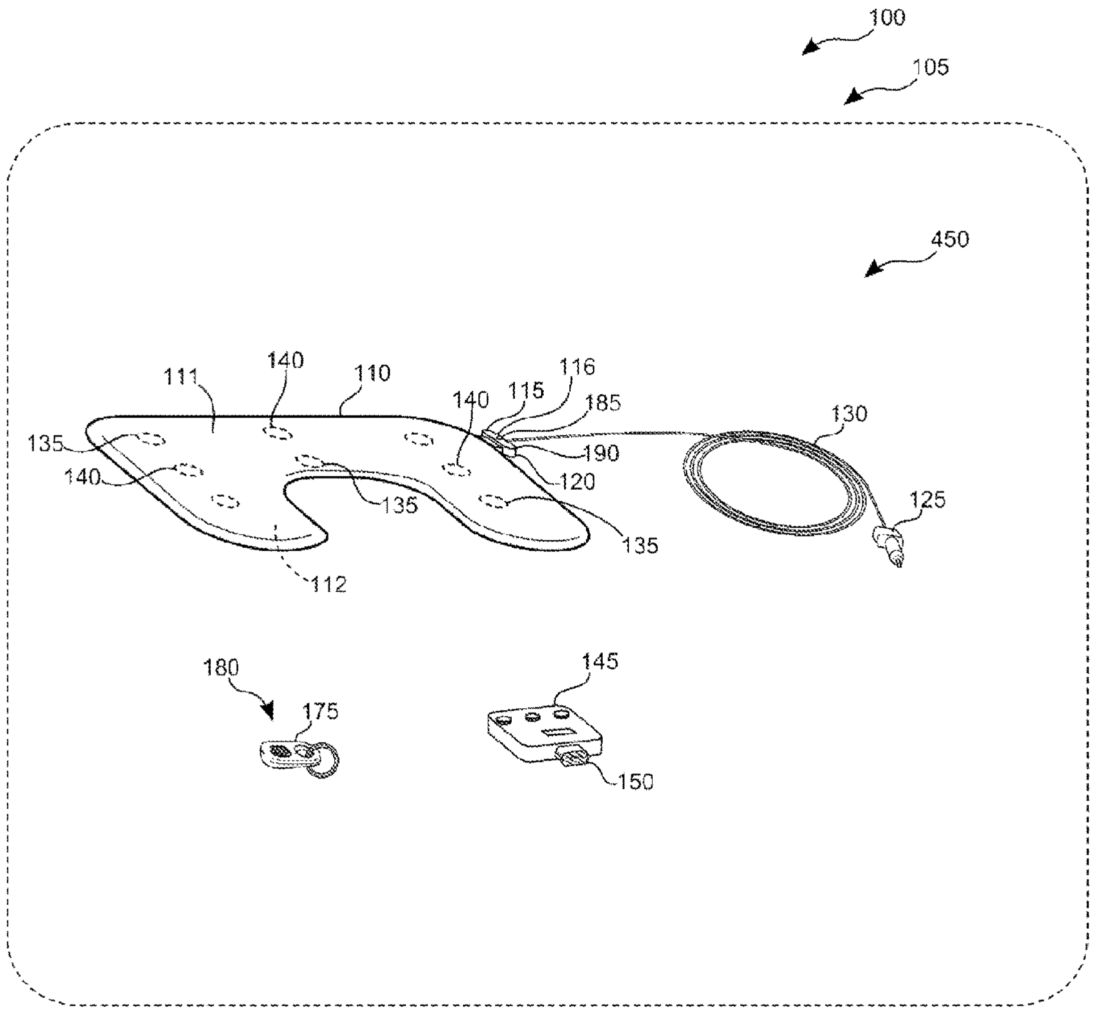
FIG. 2 is a perspective view illustrating a child detection and alert assembly of the child detection and alert system for a vehicle according to an embodiment of the present invention of FIG. 1.

Referring now to FIG. 2, a perspective view illustrating child detection and alert system for a vehicle 100 according to an embodiment of the present invention of FIG. 1.

Child detection and alert system for a vehicle 100 may comprise child detection and alert assembly 105 having sensor mat 110 with transmitter 115, battery 120, battery charger 125 having charge cord 130, at least one thermal sensor 135 and at least one weight sensor 140, and receiver 145 having vehicle computer jack 150 that are all operatively functional together to alert the occupant leaving vehicle 170 of the presence of child 155 left in child car seat 160. Child detection and alert system for a vehicle 100 is activated to a ready position when the ignition switch of vehicle 170 is turned to the on position. The anti-theft system of vehicle 170 is activated to an alarm stage about 45 seconds after thermal sensor 135 and at least one weight sensor 140 is activated after the ignition switch is turned off and the pre-set time delay period has expired. Child detection and alert assembly 105 may also be activated when a pre-determined high temperature is reached within vehicle 170, the ignition switch is in the off position, child detection and alert assembly 105 detects the presence of child 155 in child car seat 160, and the 45 second time delay has lapsed. Child detection and alert assembly 105 is de-activated after the predetermined time delay period has lapsed and the ignition switch of vehicle 170 is turned to an off position and child 155 is not detected in child car seat 160.

Child detection and alert assembly 105 further may comprise key ring fob 175 that is able to receive a wireless signal indicating an alarm condition occurring at vehicle 170, and is able to emit an audible alarm via the internally located micro-buzzer 180. Key ring fob 175 is in wireless communication with transmitter 115 and may be able to pick up a wireless signal from at least 50 feet away, and at much greater distances in favorable conditions. Key ring fob 175 also preferably comprises micro-buzzer 180 that is able to audibly produce at least a 90 db signal notifying the user that the anti-theft system of vehicle 170 is alarming.

Figure 3:
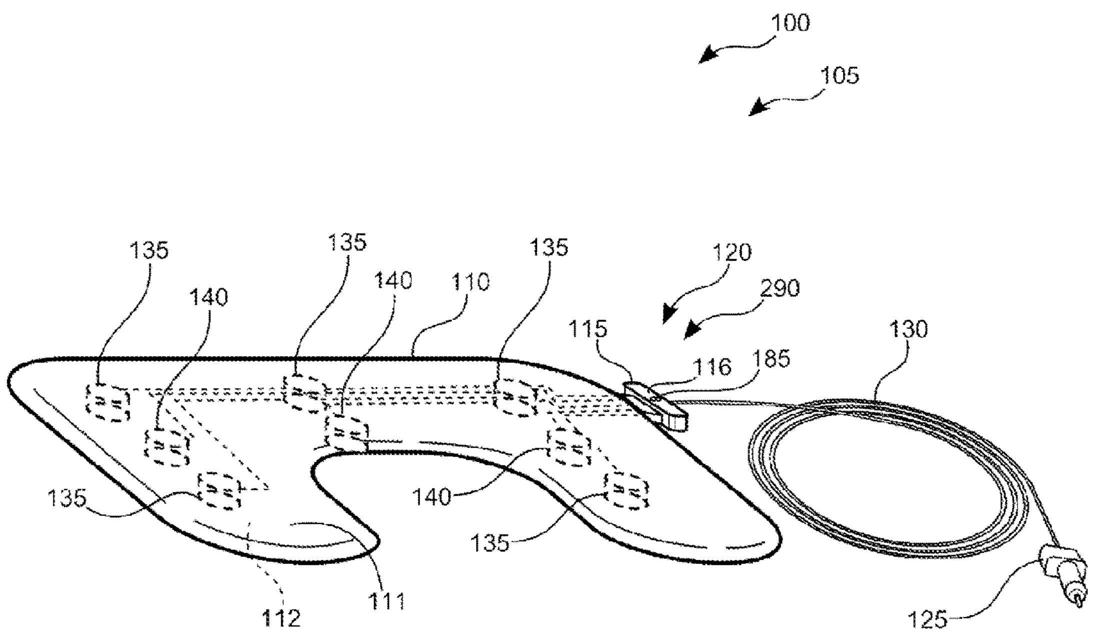
FIG. 3 is a perspective view illustrating a sensor mat of the child detection and alert system for a vehicle according to an embodiment of the present invention of FIG. 1.

Referring now to FIG. 3, a perspective view illustrating sensor mat 110 of child detection and alert system for a vehicle 100 according to an embodiment of the present invention of FIG. 1.

Sensor mat 110 is structured and arranged to be placed on the seat surface of child car seat 160 to detect body weight and body heat of child 155 sitting in child car seat 160. Sensor mat 110 is in operative communication with battery 120 and transmitter 115 which is both coupled to sensor mat 110. Transmitter 115 of sensor mat 110 comprises electronic processor 190 that is structured and arranged to interpret a signal from thermal sensor 135 and weight sensors 140 to determine whether there is child 155 sitting in child car seat 160 or not. Battery 120, transmitter 115, and electronic processor 190 are each located within a single housing 116 that is coupled to sensor mat 110 and is able operate with or without the charger being plugged in to the cigarette light socket. Sensor mat 110 may comprise an adhesive bottom side that is able to be placed on the seat surface of child car seat 160 to prevent movement of sensor mat 110 relative to child car seat 160. Transmitter 115 is in wireless communication with receiver 145 and receiver 145 is in communication with the anti-theft system of vehicle 170. Battery charger 125 is in operative communication with battery 120 and transmitter 115 such that the vehicle electrical system is able to charge battery 120 of sensor mat 110 via battery charger 125 coupled to the lighter port of vehicle 170. Battery 120 is able to power sensor mat 110 for an extended period of time.

Thermal sensors 135 and weight sensors 140 are located between top surface 111 and bottom surface 112 of sensor mat 110 and are in communication with transmitter 115. There is reset button 185 located on electronic processor 190 designed to disarm and to simultaneously reset an activated alarm.

Child detection and alert assembly 105 is designed so that more than one sensor mat 110 is able to be used simultaneously with one receiver 145 for families having more than one child 155. The second sensor mat 110 may be paired to operate in tandem with the first sensor mat 110 and receiver 145 is able to receive a wireless signal from either sensor mat 110 to activate vehicle's 170 anti-theft system. A wireless proximity sensor deactivates sensor mat 110 anytime sensor mat 110 is moved 10 feet or more away from receiver 145. This allows the driver-user to uncouple child car seat 160 and remove it from vehicle 170 without having to adjust or disable child detection and alert assembly 105 in any way, which prevents the driver-user from forgetting to re-activate child detection and alert system for a vehicle 100.

Figure 4:
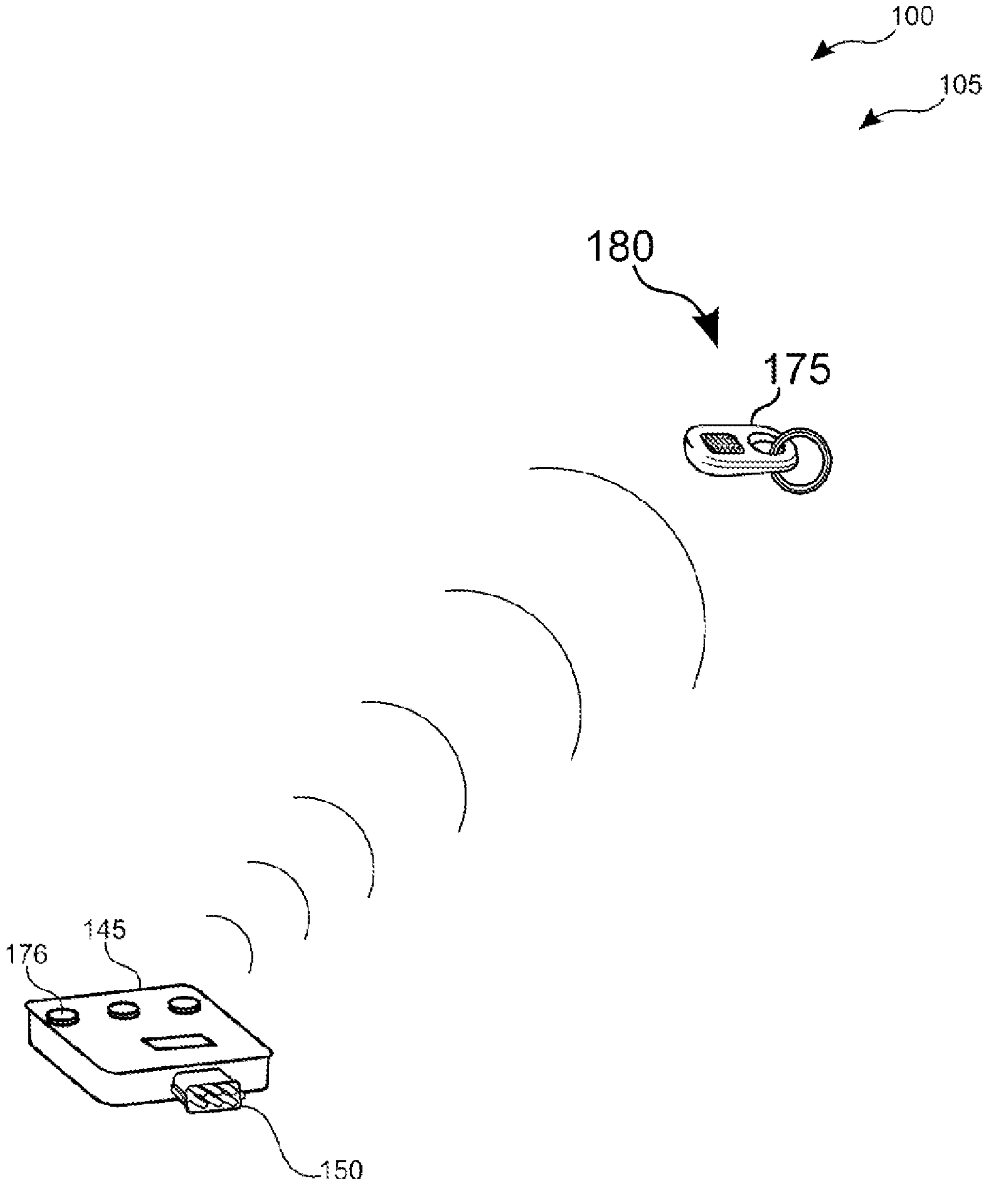
FIG. 4 is a perspective view illustrating a receiver of the child detection and alert system for a vehicle according to an embodiment of the present invention of FIG. 1.

Referring now to FIG. 4, showing a perspective view illustrating receiver 145 of child detection and alert system for a vehicle 100 according to an embodiment of the present invention of FIG. 1.

Receiver 145 is coupled vehicle computer jack 150 and is in communication with the anti-theft system of vehicle 170 and key ring fob 175 is able to communicate with receiver 145 to deactivate the anti-theft system of vehicle 170. Receiver 145 of child detection and alert assembly 105 wirelessly receives a signal from transmitter 115 when an alarm condition in present, and receives a reset command when the condition is no longer present or reset button 185 on housing 116 of transmitter 115 is pressed which wirelessly transmits a deactivation signal to vehicle 170 computer.

Child detection and alert assembly 105 may be manufactured as a retro-fit that can easily be installed by the user. Sensor mat 110 is adhesively attached to the seat of child car seat 160 and receiver 145 is coupled to vehicle's 170 computer via the computer access plug underneath the dash to complete the installation. Child detection and alert assembly 105 may also be manufactured as original manufacturer equipment for new vehicles 170. Weight sensors 140 and thermal sensor 135 may also be included in all the seats in some embodiments on new vehicles 170.

Child detection and alert system for a vehicle 100 may be sold as kit 450 comprising the following parts: at least one child detection and alert assembly 105 having at least one sensor mat 110 having transmitter 115; at least one battery charger 125 with charge cord 130; at least one battery 120; at least one thermal sensor 135; at least one weight sensor 140; at least one receiver 145 having vehicle computer jack 150; and a set of user instructions. The kit has instructions such that functional relationships are detailed in relation to the structure of the invention (such that the invention can be used, maintained, or the like in a preferred manner). Child detection and alert system for a vehicle 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different powering/transmission means for communications or combinations, parts may be sold separately, etc., may be sufficient.

Figure 5:
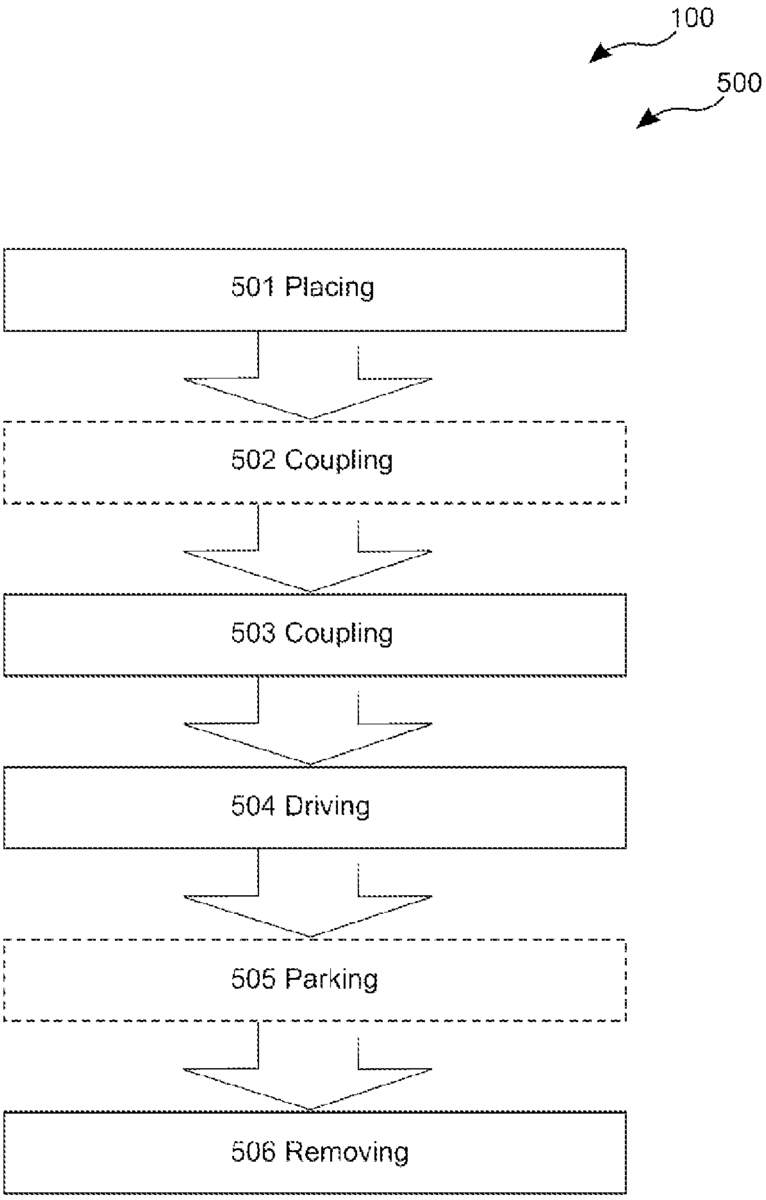
FIG. 5 is a flowchart illustrating a method of use for child detection and alert system for a vehicle according to an embodiment of the present invention of FIGS. 1-4.

Referring now to FIG. 5, showing method of use 500 for child detection and alert system for a vehicle 100. A method of using 500 child detection and alert system for a vehicle 100 may comprise the steps of step one 501 placing child 155 in child car seat 160 having an installed sensor mat 110; step two 502 coupling battery charger 125 of sensor mat 110 to the cigarette lighter socket of vehicle 170; step three 503 coupling receiver 145 to the anti-theft system module of vehicle 170 via the vehicle computer jack 150 of receiver 145; step four 504 driving vehicle 170; step five 505 parking vehicle 170 and unplugging battery charger 125; and step six 506 removing child 155 from child car seat 160.

It should be noted that steps 502 and 505 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A child detection and alert system for a vehicle comprising:

a child detection and alert assembly comprising;

a sensor mat containing;

a transmitter;

a power source;

a child presence sensor; and a receiver having; a vehicle computer jack; wherein said child detection and alert system for said vehicle comprises said child detection and alert assembly;

wherein said child detection and alert assembly is structured and arranged to utilize an existing anti-theft system of said vehicle to activate a visual and an audible alarm;

wherein said child detection and alert assembly further comprising a thermal sensor;

wherein said child detection and alert assembly is activated when an ignition switch of said vehicle is turned to an on position;

wherein said anti-theft system of said vehicle is activated after said ignition switch is turned off and said at least one thermal sensor or said child presence sensor is activated;

wherein said child detection and alert assembly is activated after a pre-determined high temperature is detected within said vehicle interior and/or said child detection and alert assembly detects a presence of said child in said child car seat;

wherein said child detection and alert assembly further comprising rolling the windows half way if said alarm condition exists and said vehicle interior reaches a pre-determined high temperature;

wherein said child detection and alert assembly is deactivated after a predetermined time delay period when said ignition switch of said vehicle is turned to an off position and no alarm condition is present;

wherein said child detection and alert assembly comprises said sensor mat, said transmitter, a battery, a charger, a charge cord, said at least one thermal sensor, said at least one child presence sensor, said receiver with said vehicle computer jack, all operatively functional together to alert an occupant leaving a vehicle of a presence of said child left in said child car seat;

wherein said sensor mat is structured and arranged to be placed on a seat surface of said child car seat to sense a body heat and a body weight and/or presence of said child sitting in said child car seat;

wherein said sensor mat is coupled and in communication with said power source and said transmitter;

wherein said power source, and said transmitter, are each located within a single housing, said housing coupled to said sensor mat;

wherein said sensor mat comprises an adhesive bottom side such that said adhesive bottom side of said mat is able to be placed on said seat surface of said child car seat to prevent movement of said sensor mat relative to said child car seat;

wherein said transmitter is in wireless communication with said receiver;

wherein said receiver is in communication with said anti-theft system of said vehicle;

wherein said charger is in operative communication with said battery such that a vehicle electrical system is able to charge said battery of said sensor mat via said charger coupled to a lighter port of said vehicle;

wherein said at least one thermal sensor is located between a top surface and a bottom surface of said sensor mat, said at least one thermal sensor is in communication with said transmitter;

wherein said at least one presence sensor is located between a top surface and a bottom surface of said sensor mat, said at least one presence sensor is in communication with said transmitter;

wherein said transmitter of said sensor mat comprises an electronic processor that is structured and arranged to interpret at least one signal from said at least one thermal sensor and from said body weight and/or proximity sensor to determine a presence and absence of said child within said child car seat;

wherein said electronic processor comprises a reset button to disarm and to simultaneously reset an activated said alarm;

wherein said child detection and alert assembly further comprises a key ring fob, said key ring fob comprising a wireless remote controller;

wherein said key ring fob of said child detection and alert assembly is able to remotely reset said anti-theft system of said vehicle to cease an audible and a visual said alarm;

wherein said key ring fob comprises a micro-buzzer, said key ring fob in communication with said transmitter such that a driver-user having said key ring fob is able to be alerted to said alarm condition at least 50 feet away from said vehicle;

wherein said child detection and alert assembly further comprises a mobile device;

wherein said mobile device is able to perform the same functions as said key ring fob;

wherein said mobile device can display information about the state of the child detection and alert assembly;

wherein said receiver is coupled to said vehicle computer jack and is in communication with said anti-theft system of said vehicle;

wherein said child detection and alert assembly comprises a retro-fit;

wherein said child detection and alert assembly comprises an original manufactured equipment system for a new said vehicle; and wherein said child detection and alert assembly is useful for detecting a presence of a child in said child car seat and alerting a driver-user leaving said vehicle via an audible and a visual alarm of said anti-theft system of said vehicle;

wherein said child detection and alert assembly is designed so that more than one sensor mat is able to be used simultaneously with said receiver for families having more than one child;

wherein a second sensor mat can be paired to operate in tandem with said first sensor mat and said receiver is able to receive a wireless signal from either of said first or second sensor mat to activate said vehicle's said anti-theft system.

2. The child detection and alert system for a vehicle of claim 1 further comprising a kit including; at least one said child detection and alert assembly having; said at least one sensor mat having; said transmitter; a battery; a battery charger with charge cord; said child presence sensor; said at least one receiver having said vehicle computer jack; and at least one set of user instructions.

* * * * *